(12) United States Patent
Drummond

(10) Patent No.: US 6,184,258 B1
(45) Date of Patent: Feb. 6, 2001

(54) SYNTHETIC MINERAL MICROPARTICLES FOR RETENTION AID SYSTEMS

(75) Inventor: Donald Kendall Drummond, Glenmoore, PA (US)

(73) Assignee: Minerals Technologies Inc., Bethlehem, PA (US)

( * ) Notice: Under 35 U.S.C. 154(b), the term of this patent shall be extended for 0 days.

(21) Appl. No.: 08/796,874

(22) Filed: Feb. 7, 1997

Related U.S. Application Data

(63) Continuation of application No. 08/289,446, filed on Aug. 12, 1994, now abandoned.

(51) Int. Cl.$^7$ ................................................. G01B 33/20
(52) U.S. Cl. ............................ 516/79; 423/277; 423/305; 423/328.1
(58) Field of Search ........................... 423/307, 277, 423/330.1, 328.1, 328.2, 700, 710, 711, 306, 305; 502/73, 263; 106/483, 486; 516/79

(56) References Cited

U.S. PATENT DOCUMENTS

| | | | |
|---|---|---|---|
| 3,784,442 | | 1/1974 | Hackbarth et al. ............. 106/288 B |
| 4,178,354 | * | 12/1979 | Murata et al. ........................ 423/306 |
| 4,213,874 | | 7/1980 | Willaims et al. ..................... 423/329 |
| 4,275,048 | * | 6/1981 | Stein et al. ......................... 423/328.1 |
| 4,285,919 | * | 8/1981 | Klotz et al. ........................... 423/277 |
| 4,440,871 | * | 4/1984 | Lok et al. ............................. 502/214 |
| 4,681,864 | * | 7/1987 | Edwards et al. ..................... 502/214 |
| 5,110,573 | * | 5/1992 | Johnson ............................... 423/705 |
| 5,151,394 | * | 9/1992 | Chitnis et al. ......................... 502/60 |
| 5,356,612 | * | 10/1994 | Curtin et al. ......................... 423/623 |
| 5,552,076 | * | 9/1996 | Gamota et al. ...................... 423/502 |

FOREIGN PATENT DOCUMENTS 9220862    5/1992   (WO).

* cited by examiner

Primary Examiner—Steven P. Griffin
Assistant Examiner—Stuart L. Hendrickson
(74) Attorney, Agent, or Firm—Marvin J. Powell; Terry B. Morris

(57) ABSTRACT

A process for the production of a synthetically produced bentonite-type inorganic microparticle. The synthetic microparticle produced according to the process of the present invention is particularly useful in papermaking processes where retention, water drainage, sheet formation and tangible cost saving opportunities are important.

4 Claims, No Drawings

SYNTHETIC MINERAL MICROPARTICLES FOR RETENTION AID SYSTEMS

This is a continuation of application Ser. No. 08/289,446 filed Aug. 12, 1994 now abandoned.

FIELD OF THE INVENTION

The present invention relates to synthetic minerals. More particularly, the present invention relates a process for making synthetic microparticles and the use of such to improve the quality of the paper products produced therefrom. Even more specifically, the present invention relates to synthetic microparticles that are particularly suitable for use in papermaking processes where retention, drainage, and sheet formation are important.

1. Background of the Invention

Papermakers continue to look for ways to further improve the effectiveness of a retention system's ability to maximize filler and pulp fines retention in the final paper product. Over the last few years, inorganic microparticle retention aid systems have been developed in response to this need. Microparticle retention systems have several advantages. Some of these advantages include, higher retention levels, improved sheet formation, and better water drainage over the sheet forming section of the papermachine. These advantages allow the papermaker to produce a quality value-added product, to operate the papermaking process at higher levels of efficiency and to improve environmental conditions by operating a cleaner workplace. The cleaner work environment, the higher machine speeds, and the better quality sheet formation, result in tangible cost saving opportunities for the papermaker.

While there are several microparticle systems currently available to papermakers, two of these systems essentially enjoy most of the commercial success and are currently, most widely utilized. These include bentonite clay based systems and colloidal silica based systems. Bentonite is a naturally occurring clay which is found in deposits throughout the world. Bentonite clay consists mainly of aluminosilicate with lesser amounts of other elements such as, for example, calcium, magnesium, and iron. Bentonite based systems are particularly suitable for use in groundwood papermaking systems. Colloidal silica based systems are a specific form of microparticulate silica having very small i.e., 1 nm to 2 nm diameter particles, which are linked together in chains or networks to form three-dimensional structures known as microcels. The silica systems are particularly employed in wood-free mills and have not enjoyed widespread use in groundwood papermaking because they are expensive, when compared to other microparticles.

What has been found to be novel and unanticipated by the prior art is a process for the production of a synthetically produced bentonite-type inorganic microparticle and the subsequent use of such in papermaking processes where retention, water drainage, sheet formation and tangible cost saving opportunities are important.

It is therefore an object of the present invention to provide a microparticle retention aid system that is capable of use in papermaking processes to maximize filler and pulp fines retention, water drainage and sheet formation. Another object of the present invention is to provide a cost effective synthetically produced bentonite type inorganic microparticle when compared to silica based systems. A further object of the present invention to provide a method for improving the quality of the paper product.

These and other objects of the present invention will become apparent as further provided in the detailed specification which follows.

2. Related Art

International Publication No. WO 92/20862 discloses a process for improving the production of paper and paper products by adding a cationic polymer and an amorphous metal silicate separately to the papermaking furnish with sufficient mixing between additions. The order of addition of these components is not critical, however, the preferred order of addition is to add the polymer prior to the last high shear element. Subsequently the amorphous metal silicate is added before feeding the resultant mixture to the headbox of a paper making machine, without subjecting the mixture to any further substantial shear. Products produced according to the process of this invention are useful for increasing retention, drainage, formation in the production of paper from pulp slurries.

U.S. Pat. No. 3,784,442 discloses the reaction of sodium silicate and aluminum sulfate in an aqueous medium. The resulting precipitate is subsequently filtered, washed and dried. Products produced according to the process of this invention are useful as pigments, and moisture conditioners and are especially useful as rubber reinforcing materials and as a filler in papermaking.

U.S. Pat. No. 4,213,874 discloses a method for producing finely divided amorphous, precipitated alkali metal alumino silicates having increased ion exchange properties. The products of the invention have base or ion exchange capacities equal to known crystalline zeolitic base exchanges or absorbents and are useful as water softening and detergent additives.

SUMMARY OR THE INVENTION

What has been found to be novel and unanticipated by the prior art is a process for the production of a synthetically produced bentonite-type inorganic microparticles and the subsequent use of such in papermaking processes where retention, water drainage, sheet formation and tangible cost saving opportunities are important.

DETAILED DESCRIPTION OF THE INVENTION

Synthetic microparticles for use as retention aids in papermaking according to the instant invention are aluminosilicates, aluminophosphatosilicates, and aluminoboratosilicates.

The aluminosilicate microparticles are prepared by aqueous precipitation techniques using soluble salts of a meta-silicate and an aluminum (III). The aluminophosphatosilicates are prepared by aqueous precipitation techniques using soluble salts of a meta-silicate, an aluminum (III), and a phosphate. The aluminoboratosilicates are prepared by aqueous precipitation techniques using soluble salts of a meta-silicate, an aluminum (III), and a borate.

The preferred process for the preparation of the synthetic microparticles of the instant invention is an aqueous precipitation process using vigorous agitation, with the reactants being combined at ambient temperature. The reactants are typically from about 1 percent to about 10 percent by weight aqueous solutions. The preferred amounts of the specific reactants used in accordance with the instant invention are now described:

Aluminosilicate Microparticles

Aluminosilicate microparticles prepared according to the present invention have the general formula:

$$M_{x/n}^{+n}[Al_xSi_yO_{2x+y}]^{-x} \cdot zH_2O$$

The values of x and y in the equation that are available in this method range from x/y=0.4 to x/y=0.7. The optimum value of x/y will vary according to the particular papermaking furnish being used.

Aluminophosphatosilicate Microparticles

Aluminophosphatosilicate microparticles prepared according to the instant invention can be described by the following general formula:

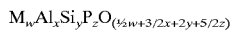

$$M_wAl_xSi_yP_zO_{(\frac{1}{2}w+3/2x+2y+5/2z)}$$

where M=H, Li, Na, K

The phosphate and meta-silicate solutions are first mixed together, then subsequently mixed with the aluminum sulfate solution to give the precipitation product. The aluminophosphatosilicate microparticles are preferred wherein the reactant molar ratio is about 0.70 Al/0.62 Si/0.36 P, the molar ratio may vary depending on the particular papermaking furnish being used.

Aluminoboratosilicate Microparticle

Aluminoboratosilicate microparticles prepared according to the instant invention can be described by the following general formula:

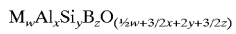

$$M_wAl_xSi_yB_zO_{(\frac{1}{2}w+3/2x+2y+3/2z)}$$

where M=H, Li, Na, K

The borate and meta-silicate solutions are first mixed together prior to mixing with the aluminum sulfate solution to give the precipitated product. The aluminoboratosilicate microparticles are preferred where in the reactant molar ratio is about 1.0 Al/1.0 Si/0.71 B, the molar ratio may vary some depending on the particular papermaking furnish being used.

The synthetic mineral microparticle product of the instant invention has a particle size in the range of from about 30 to about 3000 nanometers, more typically the range of from about 50 to about 500 nanometers, as measured on a Coulter N4 particle size analyzer. The specific surface areas (BET) of the dried invention products are from about 50 to 500 $m^2/g$ range, more typically about 100 $m^2/g$. The invention product will have a particle charge of from about –(minus) 50 to about 0 millivolts more typically from about –(minus) 40 to –(minus)20 millivolts as measured on a Coulter Delsa.

The synthetic microparticles of the instant invention can be used as a retention aid in papermaking utilizing both chemical and mechanical pulps with fillers including, but not limited to clay and calcium carbonate. The invention products are less expensive than colloidal silica retention aids and can be produced on-site at the papermill. Thus, one can tailor the product, that is, vary x and y or x, y and z to suit the papermakers particular needs. The product is able to be used "as precipitated," there is no need to separate the precipitated product from reaction liquor or wash or dry the precipitate.

The following examples are intended to further illustrate the present invention and are not to be understood to limit the invention, the scope of which is more specifically defined in the appended claims.

EXAMPLE I
Aluminosilicate

To a 200 ml beaker equipped with magnetic stirrer was added 64 ml of a 5 percent by weight $Na_2SiO_3 \cdot 5H_2O$ aqueous solution. 50 ml of a 5 percent by weight $Al_2(SO_4)_3 \cdot 18H_2O$ aqueous solution was rapidly added to the stirred meta-silicate solution. Both reactant temperatures were ambient. The mixture was stirred for an additional one minute after which the reaction was terminated. A cloudy slurry containing the microparticle, which was observed to be a nice white precipitate was obtained. Chemical analyses on the resulting precipitate by x-ray fluorescence revealed the product to be $Na\,Al\,Si_2O_6$.

EXAMPLE II
Aluminoboratosilicate

To a 100 ml beaker equipped with a magnetic stirrer was added 16 ml of a 5 percent by weight $Na_2SiO_3 \cdot 5H_2O$ aqueous solution. While stirring the previously described solution, 27 ml of a 5 percent by weight $Na_2B_4O_7 \cdot 10H_2O$ aqueous solution was then added. After stirring one minute and with rapid stirring, 25 ml of a 5 percent by weight $Al_2(SO_4)_3$ solution was quickly added. The mixture was stirred one additional minute after which the reaction was terminated. A cloudy slurry containing the microparticle, which was observed to be a nice white precipitate was obtained. Chemical analyses on the resulting precipitate by x-ray fluorescence revealed the product to be $Na_{6.5}Al_7Si_{6.6}B_{4.8}O_{34}$.

EXAMPLE III
Aluminophosphatosilicate

To a 150 ml beaker equipped with a magnetic stirrer was added 30.1 ml of a 2.23 percent by weight $Na_2SiO_3 \cdot 5H_2O$ solution. While stirring the previously described solution 20.9 ml of a 3.44 percent by weight $Na_3PO_4 \cdot 12H_2O$ solution was added. After stirring one minute 29.9 ml of a 7.07 weight percent aqueous solution of $Al_2(SO_4)_3 \cdot 18H_2O$ was quickly added. The slurry was stirred for an additional one minute after which the reaction was terminated. A cloudy slurry containing the microparticle, which was observed to be a nice white precipitate was obtained. Chemical analyses on the resulting precipitate by x-ray fluorescence revealed the product to be $Na_4Al_7Si_{6.3}P_{3.2}O_{33}$.

EXAMPLE IV

The products of Examples I, II and III were evaluated as a retention aid using standard Britt Jar techniques with Allied Colloid's Hydrocol O bentonite and/or Nalco's 8671 colloidal silica as controls. In this procedure, 500 ml of a furnish at 1% consistency with 20% added filler is dosed with starch (Stalok 400) or coagulant (Percol 368), if needed, then with a polymer flocculent (Percol 175 or Nalco 7533). The flocculated furnish is then stirred for 15 seconds at 2000 rpm in the Britt jar to produce microflocs. Next, the microparticles are added to the furnish at a dosage of 5#/ton and the mixture is stirred at 1000 rpm. The solution is then allowed to drain from the Britt jar with the first 100 ml collected and analyzed for filler retention. The clay filler retention was determined by standard ashing techniques and the calcium carbonate filler retention was determined by standard EDTA titration techniques.

TABLE 1

| Microparticle (5 Lbs./Ton) | Percol - 175 (Lbs./Ton) | Pulp | Filler | Percent Retention |
|---|---|---|---|---|
| None | 0.5 | Kraft | Calcium Carbonate | 37 |
| Example - I | 0.5 | Kraft | Calcium Carbonate | 75 |
| Hydrocol O | 0.5 | Kraft | Calcium Carbonate | 72 |
| None | 0.5 | Kraft | Calcium Carbonate | 40 |
| Example - II | 0.5 | Kraft | Calcium Carbonate | 79 |

TABLE 1-continued

| Microparticle (5 Lbs./Ton) | Percol - 175 (Lbs./Ton) | Pulp | Filler | Percent Retention |
|---|---|---|---|---|
| Hydrocol O | 0.5 | Kraft | Calcium Carbonate | 82 |
| None | 1.0 | Kraft | Calcium Carbonate | 54 |
| Example - III | 1.0 | Kraft | Calcium Carbonate | 72 |
| Hydrocol O | 1.0 | Kraft | Calcium Carbonate | 77 |

The above table illustrates the need to improve the retention when using this particular furnish and that the need is fulfilled by the invention product of examples I, II and III to essentially the same degree as commercially available Hydrocol O.

EXAMPLE V

Aluminosilicate

To a 200 ml beaker equipped with a magnetic stirrer was added 50.0 ml of a 5 percent by weight $Na_2SiO_3 \cdot 5H_2O$ aqueous solution. 31.6 ml of a 5 percent by weight $Al_2(SO_4)_3 \cdot 18H_2O$ solution was rapidly added to the stirred meta-silicate solution. Both reactant temperatures were ambient. The mixture was stirred for an additional one minute after which the reaction was terminated. A cloudy slurry containing the microparticle, which was observed to be a nice white precipitate was obtained. In the same manner as described in Example IV, the microparticle was evaluated as a retention aid.

TABLE 2

| Microparticle (5 Lbs./Ton) | Percol - 368 (Lbs./Ton) | Percol - 175 (Lbs./Ton) | Pulp | Filler | Percent Retention |
|---|---|---|---|---|---|
| None | 2 | 1 | Kraft | Clay | 37 |
| Example V | 2 | 1 | Kraft | Clay | 55 |
| Hydrocol O | 2 | 1 | Kraft | Clay | 56 |
| Nalco - 8671 | 2 | 1 | Kraft | Clay | 32 |
| None | 3 | 2 | Ground-wood | Calcium Carbonate | 49 |
| Example V | 3 | 2 | Ground-wood | Calcium Carbonate | 72 |
| Hydrocol O | 3 | 2 | Ground-wood | Calcium Carbonate | 74 |
| Nalco - 8671 | 3 | 2 | Ground-wood | Calcium Carbonate | 60 |

As can be seen in the preceding Table, using the same furnish, the invention product performs essentially as well as Hydrocol O (natural bentonite) and considerably better than Nalco-8671 (colloidal silica) as a retention aid.

I claim:

1. A process for producing a slurry of synthetic mineral microparticles comprising adding an about 1 percent to about 10 percent by weight aqueous salt solution of an aluminum (III) cation and an anion, to an about 1 percent to about 10 percent by weight aqueous meta-silicate solution while stirring at ambient temperature; and forming synthetic mineral microparticles having a particle size in the range of from about 30 to about 3,000 nanometers from the solutions.

2. The process of claim 1, further comprising first combining the meta-silicate solution with an about 1 percent to about 10 percent by weight aqueous phosphate solution, and forming aluminophosphatosilicate synthetic mineral microparticles.

3. A process for producing a slurry of synthetic mineral microparticles, comprising combining an about 1 percent to about 10 percent by weight aqueous meta-silicate solution with an about 1 percent to about 10 percent by weight aqueous borate solution, adding an about 1 percent to about 10 percent by weight salt solution of an aluminum (III) cation and an anion to the solution of meta-silicate and borate, while stirring at ambient temperature; and forming aluminoboratosilicate synthetic mineral microparticles having a particle size in the range of from about 30 to about 3,000 nanometers from the solutions.

4. The process of claim 1 wherein the produced microparticles are aluminosilicate microparticles having a particle size of from about 50 nanometers to about 500 nanometers.

* * * * *